Nov. 7, 1950        K. WILLIAMS        2,529,063
HAND BRAKE HOLDING AND RELEASING MECHANISM
Filed Nov. 20, 1945
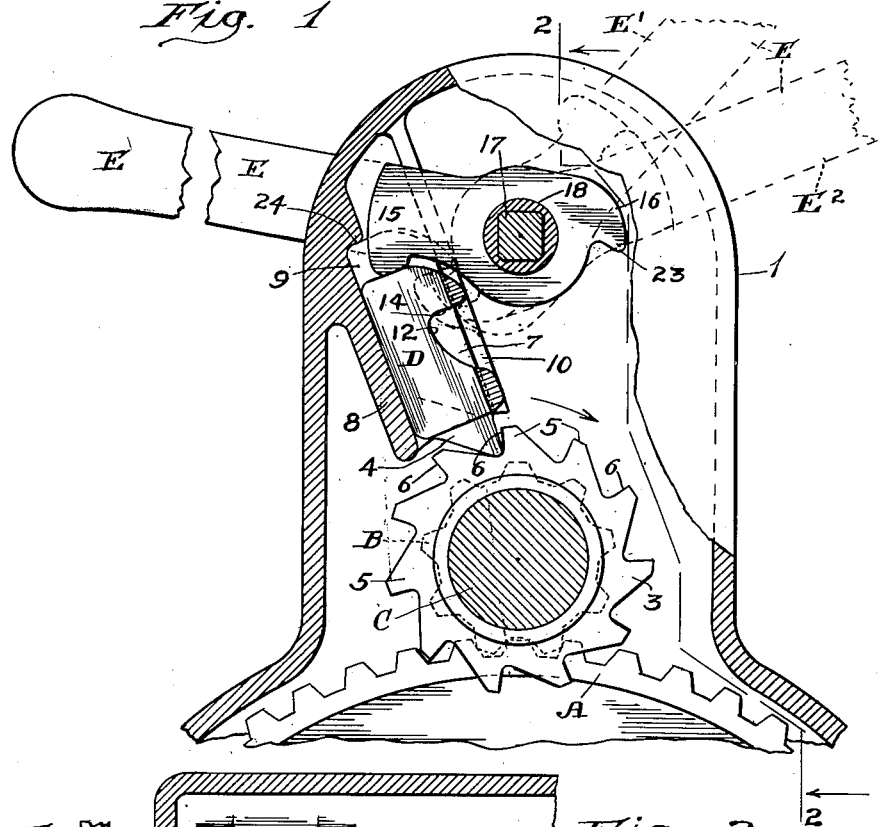
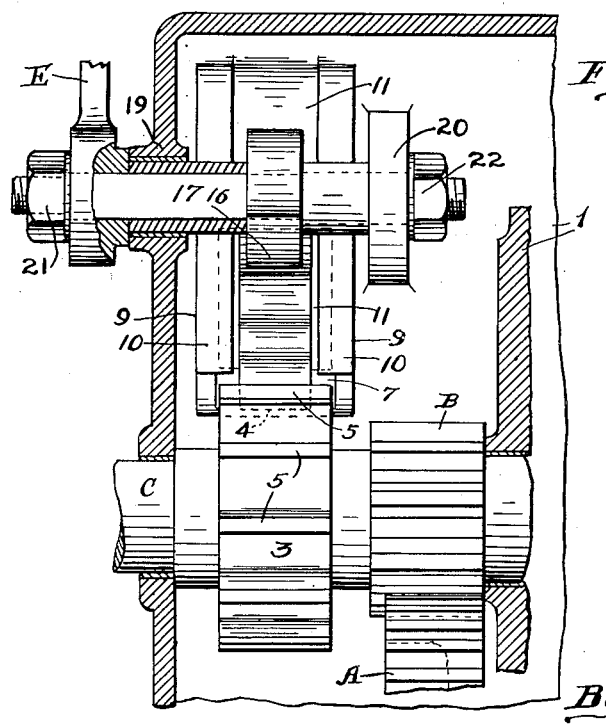
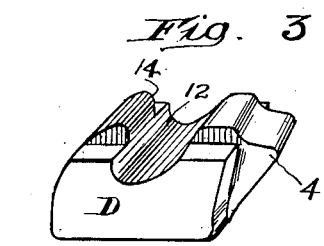
Inventor:
Keith Williams.
George I. Haight
By        Atty.

Patented Nov. 7, 1950

2,529,063

UNITED STATES PATENT OFFICE 2,529,063

HAND BRAKE HOLDING AND RELEASING MECHANISM

Keith Williams, Buffalo, N. Y.

Application November 20, 1945, Serial No. 629,883

1 Claim. (Cl. 188—81.1)

This invention relates to improvements in hand brakes for railway cars and particularly to an improved brake holding and releasing mechanism therefor.

One of the objects of the invention is to provide a holding and releasing mechanism for hand operated brake mechanism in which a sliding pawl is employed for engagement with a ratchet or toothed wheel and an operating lever is adapted in one position to positively hold the pawl in engagement with the ratchet wheel and in another position is adapted to actuate the pawl to disengage the pawl and release the brake mechanism.

Another object is to provide an inexpensive brake locking and releasing device, with a minimum of moving parts, simple to assemble and positive in action without the use of springs.

Other objects of my invention will appear from the following description in connection with the accompanying drawing which illustrates one embodiment of the invention.

Referring to the accompanying drawing,

Fig. 1 is a vertical section of the upper portion of the brake mechanism housing showing my improved holding and releasing mechanism in connection with brake operating mechanism of the hand wheel type;

Fig. 2 is a vertical sectional view on the irregular section line 2—2 of Fig. 1; and Fig. 3 is a detail perspective view of the sliding pawl.

My improvements are illustrated in connection with brake mechanism of the hand wheel type in which the chain winding drum is mounted on a shaft which has a large gear A. The large gear A is driven by a small pinion B mounted on a shaft C which extends through the housing 1 enclosing all of these parts and carries a hand wheel by which the brake mechanism is operated. This construction is well known in the art and only those parts are shown in the drawings which are necessary to an understanding of the invention.

On the pinion shaft C a toothed ratchet wheel 3 is mounted which constitutes a part of the locking or holding mechanism, the teeth of which are adapted to be engaged by the reciprocable or sliding pawl D. The pawl is generally rectangular in section and has at one end a beveled tooth or projection 4 formed to cooperate with the correspondingly beveled teeth 5 of the ratchet wheel 3, so that in the chain winding direction of rotation of the shaft the pawl tooth rides over the teeth of the ratchet and allows the brake to be set or tightened. However, the pawl tooth engages behind the radially disposed face 6 of one of the ratchet teeth and positively locks the ratchet and shaft against reverse or unwinding direction of rotation, thus holding the brake in its set condition until released by the disengagement of the pawl from the ratchet.

The pawl is generally disposed radially with respect to the ratchet wheel and is reciprocable lengthwise of itself in a socket or channel 7 which guides it in its movement. The guide socket is formed by a bottom wall 8 and two side walls 9, all preferably cast integrally with the housing 1. The side walls have ledges 10 which overlie the pawl. Thus the pawl is confined against movement in any direction except longitudinally of itself by the walls of the socket. The lower end of the socket is open and of the size of the pawl, so as to permit easy assembly and disassembly of the parts. The ledges 10 are spaced apart to provide a slot 11 for the reception of the pawl holding and actuating device.

The pawl has a cross groove or channel 12 in its upper face which provides a transverse shoulder or tooth 14 which is adapted to be engaged by the releasing device. The portions of the pawl between the ledges project into the slot.

The pawl holding and actuating device comprises a pair of fingers 15 and 16 extending in substantially diametrically opposite directions and mounted on a shaft 17 which is squared in section to securely lock the fingers to the shaft. The shaft has a sleeve or bushing 18 on each side of the fingers and which are journaled in bearings 19 and 20 formed integrally with the housing. These sleeves permit the shaft to be rotated and serve also as spacers to hold the fingers in proper position with respect to the slot 11. One end of the shaft extends to the outside of the housing and carries an operating lever E which has a square hole to key the lever to the square shaft. The lever is held on the shaft by a nut 21 screwed on the threaded end of the shaft, and the other end of the shaft is likewise threaded and provided with a nut 22, so that the shaft, bushings, fingers, and lever are all held in assembled relation and against lengthwise movement.

The lever E provides a means by which the operator actuates the pawl. The lever has a swing of almost 180° through a vertical center line of its shaft, and is so related to the fingers that when the lever is swung to the left of the center line, as shown in full lines in Fig. 1, the finger 15 bears upon the end of the pawl and holds the pawl in engagement with the ratchet wheel and when allowed to remain in this position acts to engage the pawl with the ratchet teeth when the ratchet is rotated in brake tightening direction. The lever is properly weighted so that it positively holds the pawl in contact with the ratchet wheel and yet allows the pawl to yield in order to ride the ratchet teeth in the chain winding direction of rotation thereof. The parts are so proportioned that even though the operator may spin the hand wheel and thereby the ratchet, the pawl will always engage a tooth of the ratchet when the spinning stops, and lock the ratchet against reverse rotation. When the operator desires to release the brake mechanism, he swings the lever to the opposite side of the center line, as shown in dotted lines $E^1$ in Fig. 1, and brings the toothed or projected end 23 of finger 16 into engagement with the tooth or shoulder 14 of the pawl. He can then release the brake by applying sufficient manual pressure on the lever to move it into dotted position $E^2$ and thereby pry or force the pawl out of engagement with the ratchet tooth; or he can allow the lever to remain in dotted position $E^1$ and rotate the ratchet wheel in a brake tightening direction sufficiently to relieve the strain on the pawl, whereupon the weight of the lever will move it to dotted position $E^2$ and actuate the pawl to disengage it from the ratchet teeth. A shoulder 24 in the bottom wall of the channel 7 forms a limit stop for the pawl and hence the lever.

I claim:

In a holding and releasing device for hand brake mechanism of the ratchet type, the combination of a horizontal shaft having a toothed ratchet wheel and rotatable in either direction, a socket member, a pawl slidable radially in said socket member into and out of engagement with said ratchet wheel teeth and having a tooth formed on one of its faces, a horizontal rock shaft and a lever thereon for rotating the same, a finger on the said rock shaft for engaging said tooth on said pawl and moving the same out of engagement with said ratchet wheel teeth when said lever is rocked to one side of the vertical center of said rock shaft, and a second finger on said rock shaft extending into the path of the end of said pawl away from said ratchet wheel for engaging said end of said pawl to hold it in engagement with said ratchet teeth when said lever is rocked to the opposite side of said vertical center.

KEITH WILLIAMS.

REFERENCES CITED

The following references are of record in the file of this patent:

UNITED STATES PATENTS

| Number | Name | Date |
| --- | --- | --- |
| 1,512,925 | Haseltine | Oct. 28, 1924 |
| 1,845,513 | O'Connor | Feb. 16, 1932 |
| 1,879,973 | Burnett | Sept. 27, 1932 |
| 2,158,055 | Burnett | May 16, 1939 |
| 2,311,398 | Klasing | Feb. 16, 1943 |